United States Patent
Xu et al.

(10) Patent No.: US 11,025,950 B2
(45) Date of Patent: Jun. 1, 2021

(54) MOTION FIELD-BASED REFERENCE FRAME RENDERING FOR MOTION COMPENSATED PREDICTION IN VIDEO CODING

(71) Applicant: GOOGLE LLC, Mountain View, CA (US)

(72) Inventors: Yaowu Xu, Saratoga, CA (US); Jingning Han, Santa Clara, CA (US); Ching-Han Chiang, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 329 days.

(21) Appl. No.: 15/893,978

(22) Filed: Feb. 12, 2018

(65) Prior Publication Data

US 2019/0158873 A1 May 23, 2019

Related U.S. Application Data

(60) Provisional application No. 62/588,505, filed on Nov. 20, 2017.

(51) Int. Cl.
*H04N 19/00* (2014.01)
*H04N 19/573* (2014.01)
(Continued)

(52) U.S. Cl.
CPC ......... *H04N 19/573* (2014.11); *H04N 19/147* (2014.11); *H04N 19/176* (2014.11);
(Continued)

(58) Field of Classification Search
CPC ..................................................... H04N 19/00
See application file for complete search history.

(56) References Cited

U.S. PATENT DOCUMENTS

| 10,511,852 | B1* | 12/2019 | Xu | H04N 19/513 |
| 2013/0121416 | A1* | 5/2013 | He | H04N 19/597 |
| | | | | 375/240.14 |
| 2014/0307982 | A1* | 10/2014 | Kanaev | G06T 3/4053 |
| | | | | 382/299 |

OTHER PUBLICATIONS

J. Chen et al., "Algorithm description of Joint Exploration Test Model 7 (JEM7)", Joint Video Exploration Team (JVET) of ITU-T SG 16 WP 3 and ISO/IEC JTC1/SC29/WG11, 7th Meeting, Torino, Italy, Jul. 13-21, 2017 (url: http://phenix.int-evry.fr/jvet/, document No. JVET-G1001 (Aug. 19, 2017), 48 pgs.

(Continued)

*Primary Examiner* — Maryam A Nasri
(74) *Attorney, Agent, or Firm* — Young Basile Hanlon & MacFarlane, P.C.

(57) ABSTRACT

A motion-field based reference frame is rendered that can be used to perform a prediction process for a first frame of a video sequence to be predicted. A first reference frame from the video sequence for forward inter prediction of the first frame is determined, as is a second reference frame from the video sequence for backward inter prediction of the first frame. A respective motion field determined for blocks of the first frame is used to determine parameters forming an affine homographic model. A current block of a reconstructed reference frame is rendered at a co-located position within a motion field-based reference frame by applying the affine homographic model to the current block. An affine homographic model may be determined for each reconstructed reference frame block to render the motion-field based reference frame.

17 Claims, 10 Drawing Sheets

(51) Int. Cl.
| | |
|---|---|
| H04N 19/567 | (2014.01) |
| H04N 19/70 | (2014.01) |
| H04N 19/147 | (2014.01) |
| H04N 19/51 | (2014.01) |
| H04N 19/577 | (2014.01) |
| H04N 19/176 | (2014.01) |
| H04N 19/182 | (2014.01) |
| H04N 19/44 | (2014.01) |

(52) U.S. Cl.
CPC ........... *H04N 19/182* (2014.11); *H04N 19/44* (2014.11); *H04N 19/51* (2014.11); *H04N 19/567* (2014.11); *H04N 19/577* (2014.11); *H04N 19/70* (2014.11)

(56) References Cited

OTHER PUBLICATIONS

International Search Report and Written Opinion in PCT/US2018/047223, dated Nov. 16, 2018, 18 pgs.

Huawei Technologies Co., Ltd., "Affine transform prediction for next generation video coding" ITU-T SG16 Meeting, Oct. 12-23, 2015, Geneva, CH, No. T13-SG16-C-1016 (Sep. 29, 2015), pp. 1-11.

Matthias Narroschke et al., "Extending HEVC by an affine motion model", IEEE 2013 Picture Coding Symposium (PCS), Dec. 8, 2013, pp. 321-324.

Bankoski, et al., "Technical Overview of VP8, An Open Source Video Codec for the Web", Jul. 11, 2011, 6 pp.

Bankoski et al, "VP8 Data Format and Decoding Guide", Independent Submission RFC 6389, Nov. 2011, 305 pp.

Bankoski et al, "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

\* cited by examiner

MOTION FIELD-BASED REFERENCE FRAME RENDERING FOR MOTION COMPENSATED PREDICTION IN VIDEO CODING

CROSS-REFERENCE TO RELATED APPLICATION

This application claims priority to U.S. Provisional Patent Application No. 62/588,505, filed Nov. 20, 2017, the entire content of which is incorporated by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

One technique for compression uses a reference frame to generate a prediction block corresponding to a current block to be encoded. Differences between the prediction block and the current block can be encoded, instead of the values of the current block themselves, to reduce the amount of data encoded.

SUMMARY

This disclosure relates generally to encoding and decoding video data and more particularly relates to rendering a motion field-based reference frame used for motion compensated prediction in video compression.

This disclosure describes encoding and decoding methods and apparatuses. A method according to an implementation of the disclosure includes determining a first frame to be predicted, the first frame being in a video sequence, determining a first reference frame from the video sequence for forward inter prediction of the first frame, determining a second reference frame from the video sequence for backward inter prediction of the first frame, determining a respective motion field for blocks of the first frame using at least one of the first reference frame or the second reference frame, determining parameters forming an affine homographic model using the motion field, rendering a current block of a reconstructed reference frame at a co-located position within a motion field-based reference frame by applying the affine homographic model to the current block, and performing a prediction process for the first frame using the motion field-based reference frame.

An apparatus according to an implementation of the disclosure includes a non-transitory storage medium or memory and a processor. The medium includes instructions executable by the processor to carry out the method described above.

Another apparatus according to an implementation of the disclosure includes a non-transitory storage medium or memory and a processor. The medium includes instructions executable by the processor to carry out a method including determining a first frame from a video sequence, determining a first reference frame from the video sequence for forward inter prediction of the first frame, determining a second reference frame from the video sequence for backward inter prediction of the first frame, determining a motion field for at least some of the block of the first frame using at least one of the first reference frame or the second reference frame, generating at least one affine homographic model using the motion field, rendering a current block of a reconstructed reference frame at a co-located position within a motion field-based reference frame by applying the affine homographic model to the current block, and performing a prediction process for the first frame using the motion field-based reference frame.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below wherein like reference numerals refer to like parts throughout the several views unless otherwise noted.

DETAILED DESCRIPTION

Figure 1:
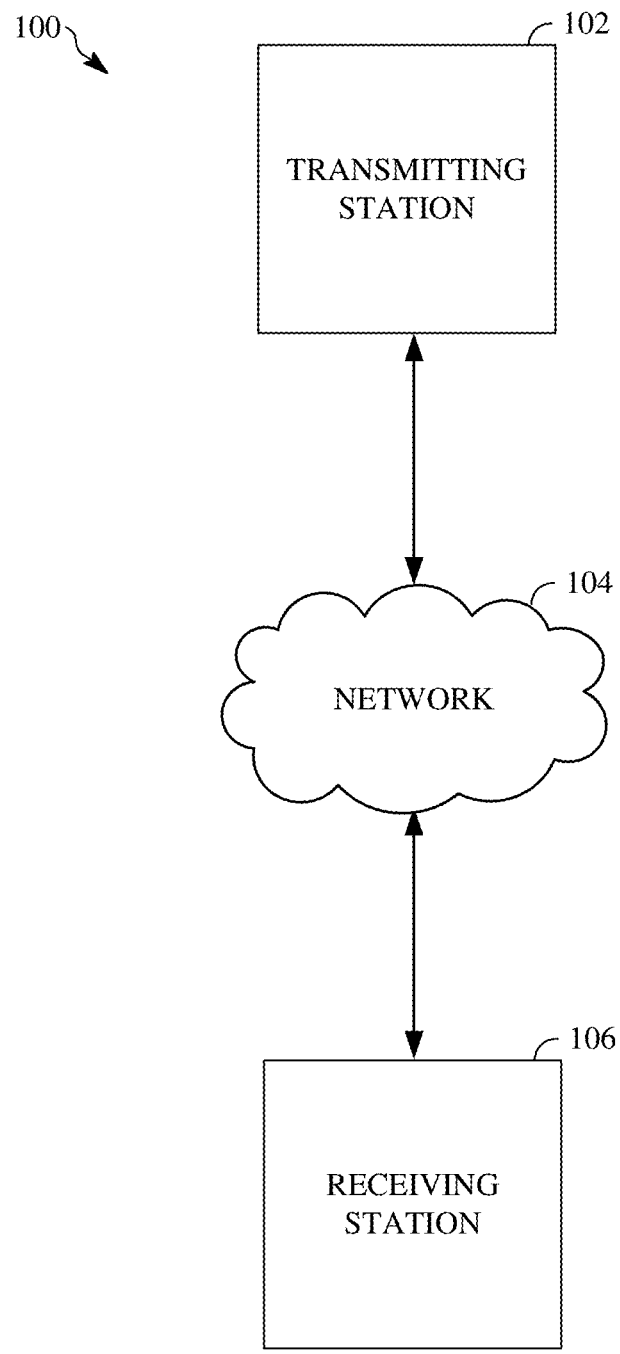
FIG. 1 is a schematic of a video encoding and decoding system.

A video stream can be compressed by a variety of techniques to reduce bandwidth required transmit or store the video stream. A video stream can be encoded into a bitstream, which involves compression, and is then transmitted to a decoder that can decode or decompress the video stream to prepare it for viewing or further processing. Compression of the video stream often exploits spatial and temporal correlation of video signals through spatial and/or motion compensated prediction. Motion compensated prediction, for example, uses one or more motion vectors to generate a block (also called a prediction block) that resembles a current block to be encoded using previously encoded and decoded pixels. By encoding the motion vector(s), and the difference between the two blocks, a decoder receiving the encoded signal can re-create the current block. Motion compensated prediction may also be referred to as inter prediction.

Each motion vector used to generate a prediction block in the inter-prediction process refers to a frame other than a current frame, i.e., a reference frame. Reference frames can be located before or after the current frame in the sequence of the video stream, and may be frames that are reconstructed before being used as a reference frame. In some cases, there may be three or more reference frames used to encode or decode blocks of the current frame of the video sequence. One may be a frame that is referred to as a golden frame. Another may be a most recently encoded or decoded frame. Another may be an alternative reference frame that is encoded or decoded before one or more frames in a sequence, but which is displayed after those frames in an output display order. In this way, the alternative reference frame is a reference frame usable for backwards prediction. One or more forward and/or backward reference frames can be used to encode or decode a block. The efficacy of a reference frame when used to encode or decode a block within a current frame can be measured based on a resulting signal-to-noise ratio or other measures of rate-distortion.

In this technique, the pixels that form prediction blocks are obtained directly from one or more of the available reference frames. The reference pixel blocks or their linear combinations are used for prediction of the given coding block in the current frame. This direct, block-based prediction may not capture the true motion activity available from the reference frames. That is, motion other than translational motion, e.g., general affine motion of objects, is not efficiently captured. For this reason, motion compensated prediction accuracy can suffer.

To more fully utilize motion information from available bi-directional reference frames (e.g., one or more forward and one or more backward reference frames), implementations of the teachings herein describe the rendering of a reference frame collocated with the current coding frame using motion field estimation. This reference frame is referred to as a motion field-based reference frame herein.

Rendering the motion field-based reference frame involves initially building up a motion field estimation for the current frame via linear projection of the motion vectors from bi-directional reference frames. For any given block in the current frame, the estimated motion vectors assigned to it as well as its surrounding neighbors are available. Such closed boundary motion information allows a relatively precise estimate of an affine homographic model that maps the current block towards pixels in a reference frame. The resulting motion field-based reference frame is capable of handling a non-translational motion model.

Further details of rendering a motion field-based reference frame for use in video compression and reconstruction are described herein with initial reference to a system in which the teachings herein can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
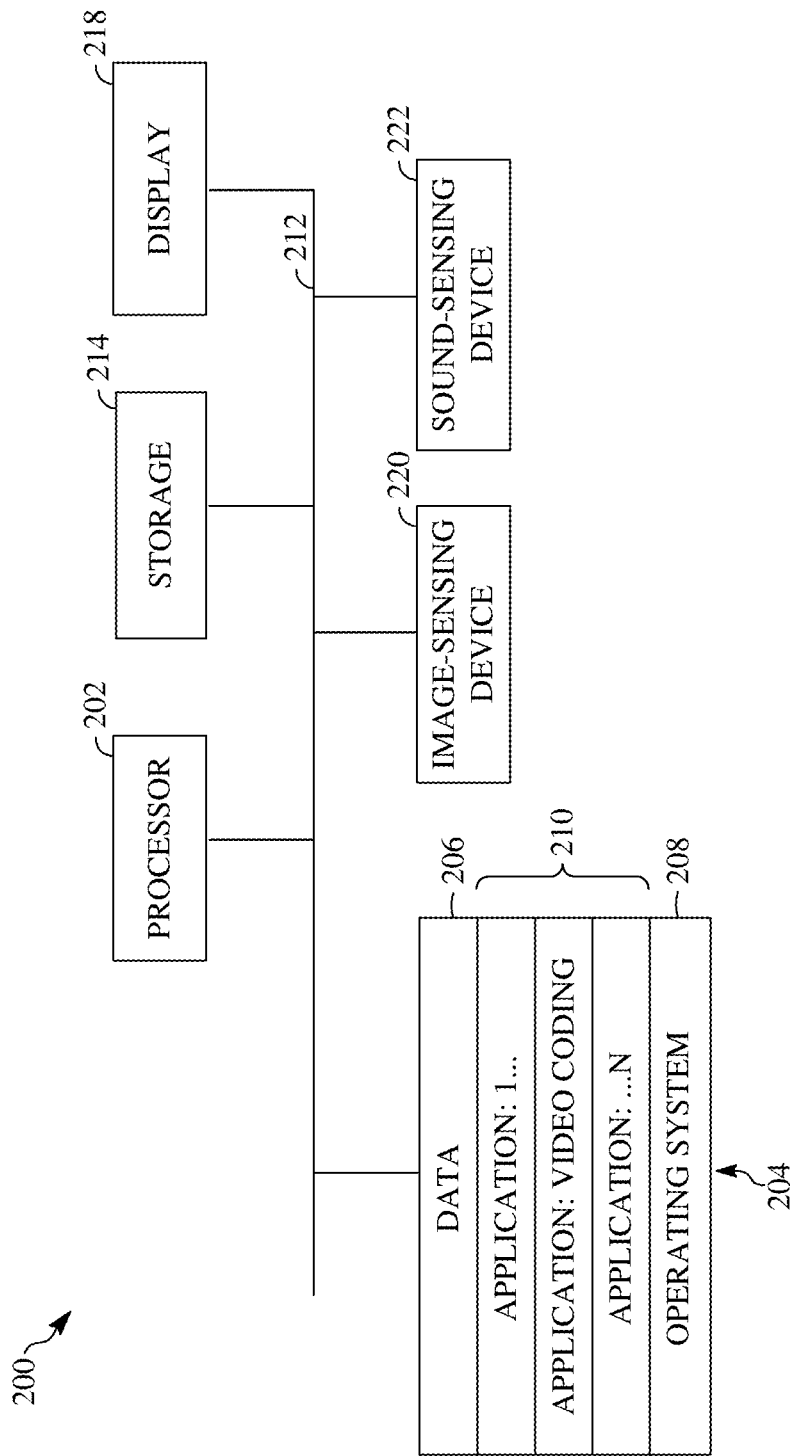
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having a non-transitory storage medium or memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP) based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random access memory (RAM) device in an implementation. Any other suitable type of storage device or non-transitory storage medium can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
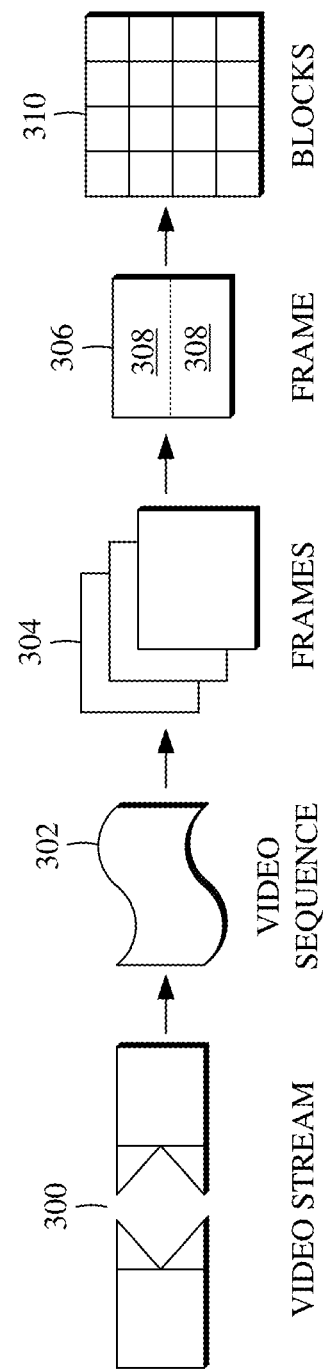
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
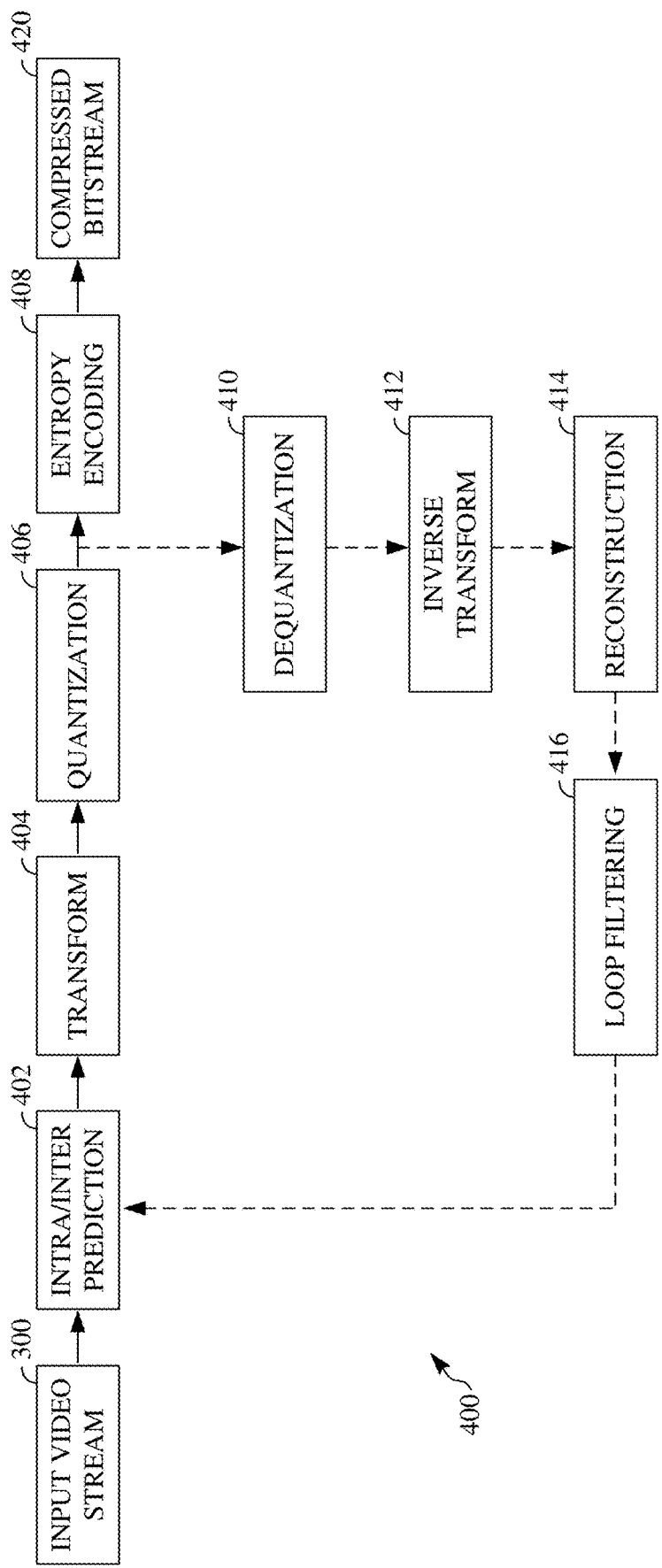
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames. The designation of reference frames for groups of blocks is discussed in further detail below.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
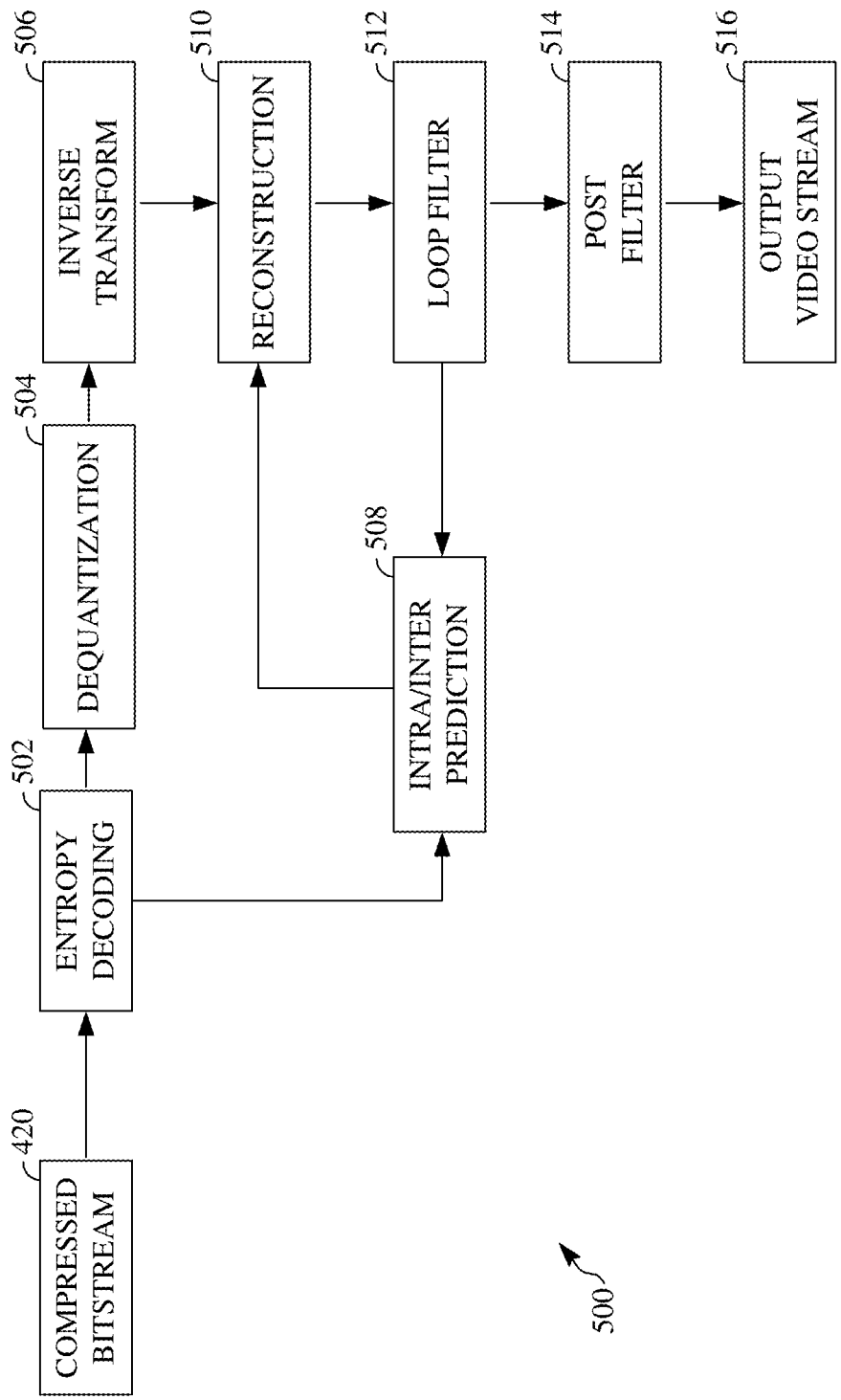
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the post filtering stage 514 may be a deblocking filter that is applied to the reconstructed block to reduce blocking distortion. The result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the post filtering stage 514.

A reference frame buffer may store reference frames used to encode or decode blocks of frames of a video sequence. For example, reference frames may be identified as a last frame LAST_FRAME, a golden frame GOLDEN_FRAME, or an alternative reference frame ALTREF_FRAME. A frame header of a reference frame may include a virtual index to a location within the reference frame buffer at which the reference frame is stored. A reference frame mapping may map the virtual index of a reference frame to a physical index of memory at which the reference frame is stored. Where two reference frames are the same frame, those reference frames will have the same physical index even if they have different virtual indexes. The number and type of reference frames stored within a reference frame buffer may differ.

The reference frames stored in a reference frame buffer can be used to identify motion vectors for predicting blocks of frames to be encoded or decoded. Different reference frames may be used depending on the type of prediction used to predict a current block of a current frame. For example, in bi-prediction, blocks of the current frame can be forward predicted using either frame stored as the LAST_FRAME or the GOLDEN_FRAME, and backward predicted using a frame stored as the ALTREF_FRAME.

Figure 6:
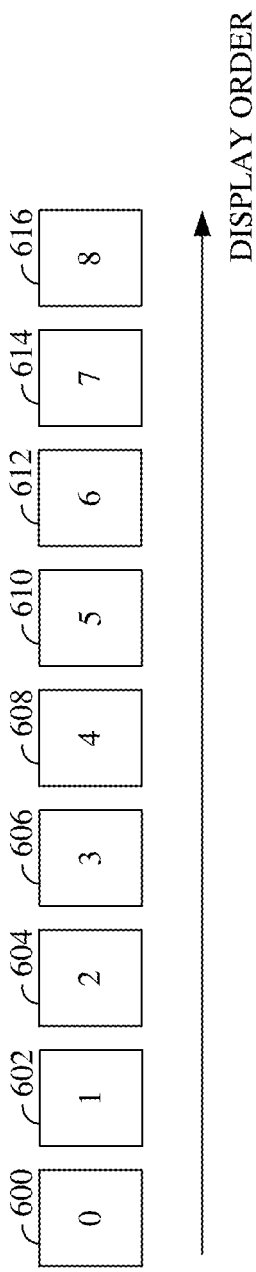
FIG. 6 is a diagram of a group of frames in a display order of a video sequence.

FIG. 6 is a diagram of a group of frames in a display order of the video sequence. In this example, the group of frames is preceded by a frame 600, which can be referred to as a key frame or an overlay frame in some cases, and comprises eight frames 602-616. No block within the frame 600 is inter predicted using reference frames of the group of frames. The frame 600 is a key (also referred to as intra-predicted frame) in this example, which refers to its status that predicted blocks within the frame are only predicted using intra prediction. However, the frame 600 can be an overlay frame, which is an inter-predicted frame that can be a reconstructed frame of a previous group of frames. In an inter-predicted frame, at least some of the predicted blocks are predicted using inter prediction. The number of frames forming each group of frames can vary according to the video spatial/temporal characteristics and other encoded configurations, such as the key frame interval selected for random access or error resilience, for example.

The coding order for each group of frames can differ from the display order. This allows a frame located after a current frame in the video sequence to be used as a reference frame for encoding the current frame. A decoder, such as the decoder 500, may share a common group coding structure with an encoder, such as the encoder 400. The group coding structure assigns different roles that respective frames within the group may play in the reference buffer (e.g., a last frame, an alternative reference frame, etc.) and defines or indicates the coding order for the frames within a group.

Figure 7:
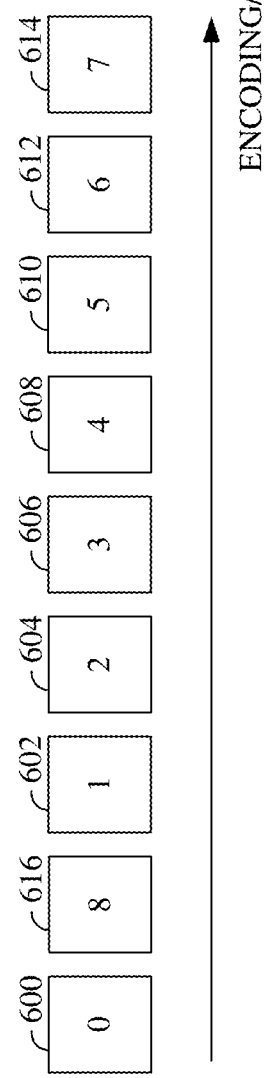
FIG. 7 is a diagram of an example of a coding order for the group of frames of FIG. 6.

FIG. 7 is a diagram of an example of a coding order for the group of frames of FIG. 6. The coding order of FIG. 7 is associated with a first group coding structure whereby a single backward reference frame is available for each frame of the group. Because the encoding and decoding order is the same, the order shown in FIG. 7 is generally referred to herein as a coding order. The key or overlay frame 600 is designated the golden frame in a reference frame buffer, such as the GOLDEN_FRAME in a reference frame buffer. The frame 600 is intra-predicted in this example, so it does not require a reference frame, but an overlay frame as the frame 600, being a reconstructed frame from a previous group, also does not use a reference frame of the current group of frames. The final frame 616 in the group is designated an alternative reference frame in a reference frame buffer, such as the ALTREF_FRAME. In this coding order, the frame 616 is coded out of the display order after the frame 600 so as to provide a backward reference frame for each of the remaining frames 602-614. In coding blocks of the frame 616, the frame 600 serves as an available reference frame for blocks of the frame 616. FIG. 7 is only one example of a coding order for a group of frames. Other group coding structures may designate one or more different or additional frames for forward and/or backward prediction.

As mentioned briefly above, an available reference frame may be a motion field-based reference frame portion rendered by a motion field. The motion field-based reference frame may be referred to as a co-located reference frame herein because the dimensions are the same as the current frame.

Figure 8:
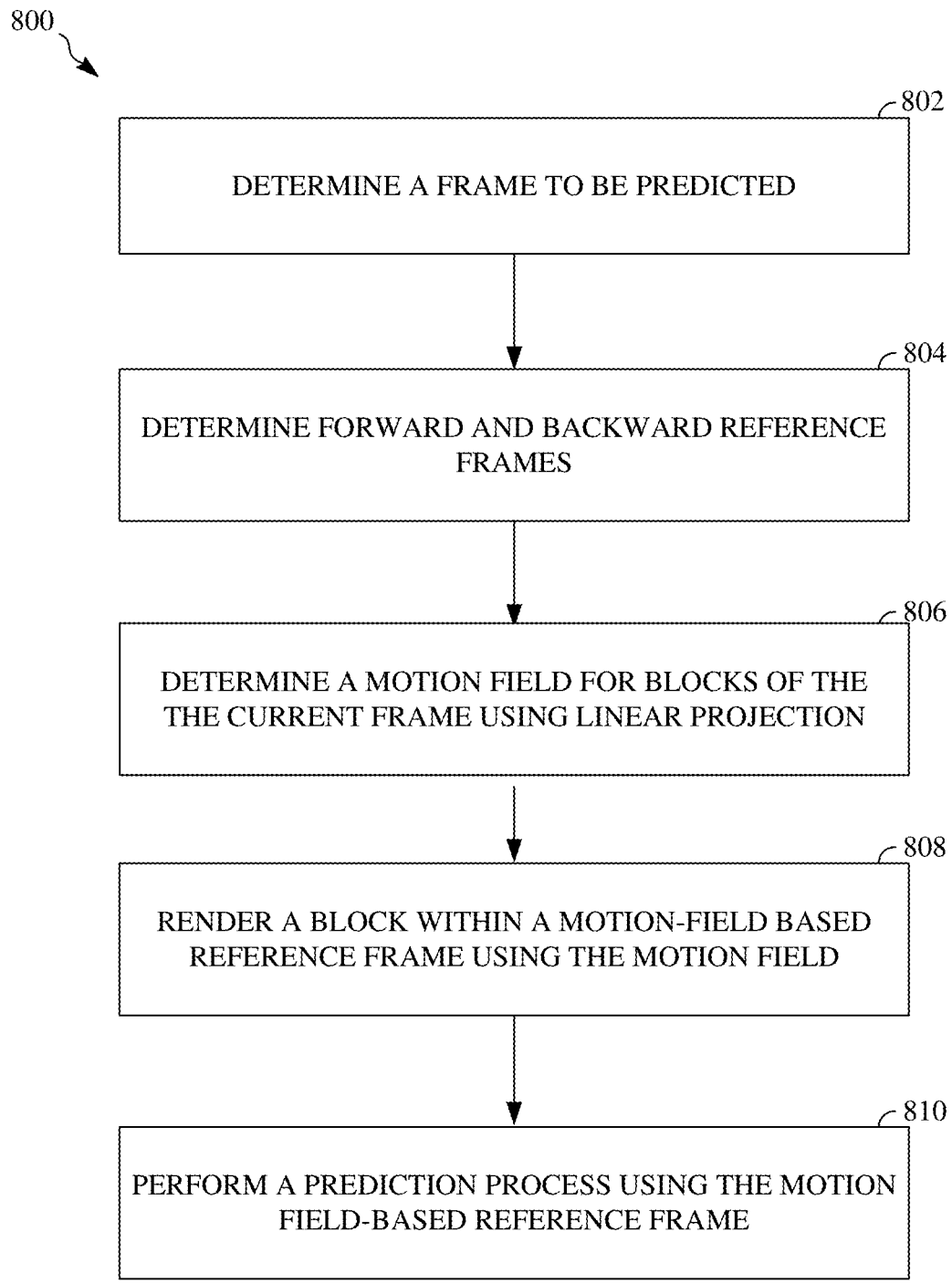
FIG. 8 is a flowchart diagram of a process for motion compensated prediction of a frame of a video sequence using a reference frame generated based on a motion field.

FIG. 8 is a flowchart diagram of a method or process 800 for motion compensated prediction of a frame of a video sequence using a reference frame rendered based on a motion field. The process 800 can be implemented, for example, as a software program that may be executed by computing devices such as transmitting station 102 or receiving station 106. For example, the software program can include machine-readable instructions that may be stored in a memory such as the memory 204 or the secondary storage 214, and that, when executed by a processor, such as CPU 202, may cause the computing device to perform the process 800. The process 800 can be implemented using specialized hardware or firmware. Some computing devices may have multiple memories or processors, and the operations described in the process 800 can be distributed using multiple processors, memories, or both.

At 802, a current frame to be predicted is determined. Frames may be coded, and hence predicted, in any order, such as in the coding order shown in FIG. 7. The frames to be predicted may also be referred to as a first, second, third, etc. frame. The label of first, second, etc., does not necessarily indicate an order of the frames. Instead the label is used to distinguish one current frame from another herein unless otherwise stated. At an encoder, the frame may be processed in units of blocks in a block coding order, such as a raster scan order. At a decoder, the frame may also be processed in units of blocks according to receipt of their encoded residuals within an encoded bitstream.

At 804, forward and backward reference frames are determined. In the examples described herein, the forward and backward reference frames are the nearest reconstructed frames before and after (e.g., in display order) the current frame, such as the current frame at frame index X described below. Although not expressly shown in FIG. 8, if either a forward or backward reference frame does not exist, the process 800 is not performed for the current frame. Instead, the current frame is processed according to any known technique.

Provided that forward and backward reference frames exist at 804, the process 800 can advance to 806 to determine a motion field for the current frame. Determining the motion field may include performing linear projection of the motion vectors from the reference frames, which is described in more detail with reference to FIG. 9.

Figure 9:
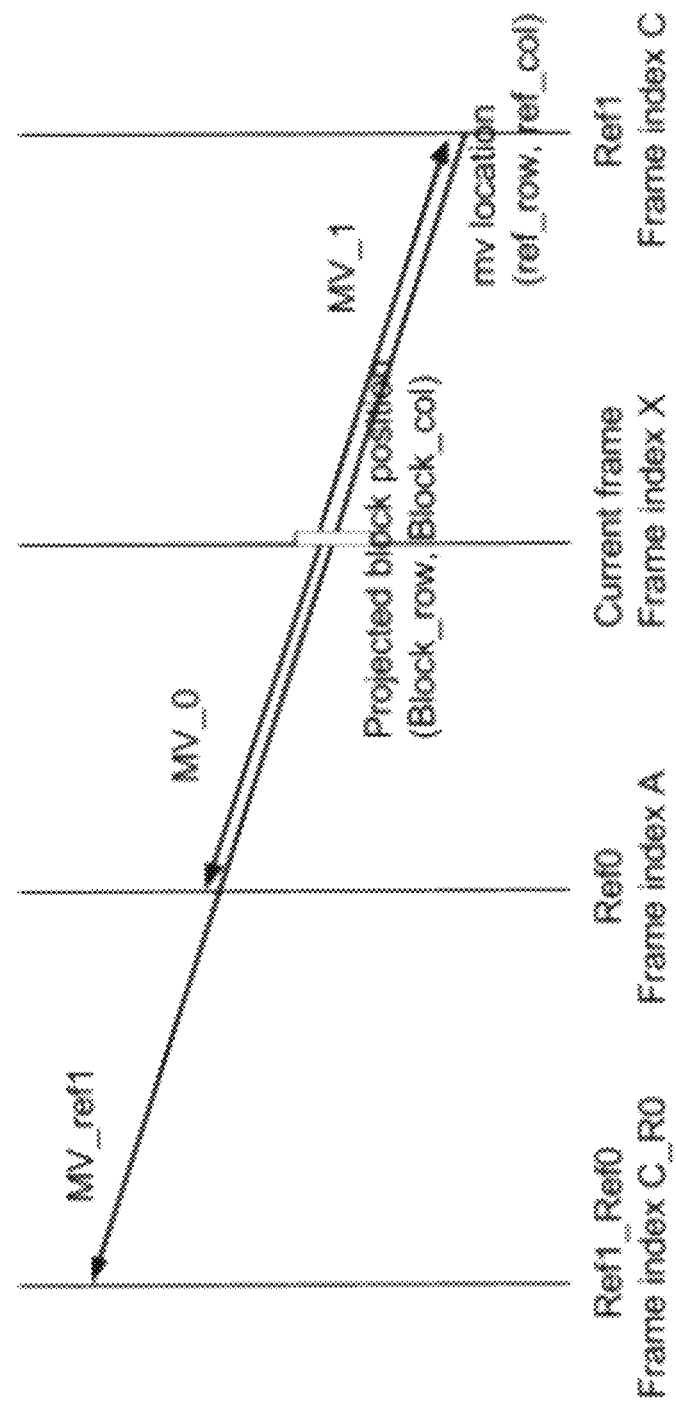
FIG. 9 is a diagram used to explain linear projection of the motion vectors according to the teachings herein.

FIG. 9 is a diagram used to explain linear projection of the motion vectors according to the teachings herein. The motion field of the current frame may be estimated using the nearest available reconstructed (e.g., reference) frames before and after the current frame, additional reference frames, or different reference frames. In FIG. 9, the current frame has a frame index X. The motion field of the current frame includes motion vectors from the current frame towards, in this example, reference frames Ref0, Ref1, and Ref1_Ref0, or more reference frames if available. The motion vectors may be stored with regard to respective 8×8 blocks of the current frame, but different size blocks, or other portions of the current frame, may be considered, e.g., in the frame scan order. In other words, the description herein uses an 8×8 block to describe the processing at 806, but this is an example only. The teachings may be applied to frame portions that are formed of other than blocks and to blocks of different sizes.

The reference frame Ref0 is a reference frame that may be used for forward prediction of the current frame, while the reference frame Ref1 is a reference frame that may be used for backward prediction of the current frame. Using the example of FIGS. 6 and 7 for illustration, if the current frame is the frame 606, the immediately preceding, or last, frame 604 (e.g., the reconstructed frame stored in a reference frame buffer as the LAST_FRAME) can be used as the reference frame Ref0, while the frame 616 (e.g., the reconstructed frame stored in a reference frame buffer as the ALTREF_FRAME) can be used as the reference frame Ref1.

Knowing the display indexes of the current and reference frames, motion vectors may be projected between the pixels in the reference frames Ref0 and Ref1 to the pixels in the current frame assuming that the motion field is linear in time. In the example described with regard to FIGS. 6 and 7, the frame index X for the current frame is 3, the frame index A for the reference frame Ref0 is 2, and the frame index C for the reference frame Ref1 is 8. The frame index C_R0 for the reference frame Ref1_Ref0 may be 1, for example.

Linear projection may be illustrated starting with reference frame Ref1, having a frame index C. From reference frame Ref1, a motion vector MV_ref1 goes from reference frame Ref1 to the reference frame for the reference frame Ref1, namely Ref1_Ref0, whose frame index is C_R0. A motion vector contains two components, a row and column, to represent the spatial offset. Accordingly, the block located at (ref_row, ref_col) within reference frame Ref1 was predicted using the motion vector MV_ref1 and reference frame Ref1_Ref0 in this example.

This motion vector MV_ref1 is projected onto the current frame to determine where the motion trajectory fits in the current frame. The block position offset is calculated accordingly to:

$$Block\_row = ref\_row + MV\_ref1.row * (C-X)/(C-C\_R0); \text{ and}$$

$$Block\_col = ref\_col + MV\_ref1.col * (C-X)/(C-C\_R0),$$

where MV_ref1.row is a first (e.g., a vertical) component of the motion vector MV_ref1, and MV_ref1.col is a second (e.g., a horizontal) component of the motion vector MV_ref1. The projected block position within the current frame is (Block_row, Block_col).

Next, for the block position (Block_row, Block_col) in the current frame, its motion vector MV_0 is estimated towards reference frame Ref0 according to:

MV_0.row=MV_ref1.row*(X−A)/(C−C_R0); and

MV_0.col=MV_ref1.col*(X−A)/(C−C_R0),    where MV_0.row is a first (e.g., a vertical) component of the motion vector MV_0, and MV_0.col is a second (e.g., a horizontal) component of the motion vector MV_0.

Similarly, the motion vector MV_1 is estimated towards reference frame Ref1 for the same block position (Block_row, Block_col) in the current frame according to:

MV_1.row=MV_ref1.row*(X−C)/(C−C_R0); and

MV_1.col=MV_ref1.col*(X−C)/(C−C_R0),    where MV_1.row is a first (e.g., a vertical) component of the motion vector MV_1, and MV_1.col is a second (e.g., a horizontal) component of the motion vector MV_1.

The collection of motion vectors MV_0 and MV_1 for the blocks of the current frame forms the motion field for the current frame.

While in the example above, the linear projection used motion vectors of reference frame Ref1, this is an example only. The motion vectors of any other reference frame, such as reference frame Ref0 may be used.

Selecting the nearest available reconstructed forward and backward reference frames and assuming linear motion allows the motion field to be estimated at both an encoder and a decoder (e.g., at the intra/inter prediction stage 402 and the intra/inter prediction stage 508) without transmitting extra information. Instead of the nearest available reconstructed reference frames, it is possible that different frames may be used as designated a priori between the encoder and decoder. In some implementations, identification of the frames for a current frame portion may be transmitted.

Referring back to FIG. 8, after the motion field for the current frame is determined at 806, the process 800 advances to 808. At 808, the motion field-based reference frame is rendered. The motion field-based reference frame may be rendered using a previously reconstructed reference frame and the motion field pointing towards that reference frame. The reference frame nearest to the current frame in natural order, such as the display order shown in FIG. 6, may be selected. In this way, the reconstructed reference frame may be the first reference frame for forward inter prediction used to generate the motion field, the second reference frame for backward inter prediction used to generate the motion field, or some other reference frame from the video sequence. In the example above where the current frame is the frame 606, the frame 604 (the first reference frame) may be used as the closest reconstructed reference frame. The rendering may be processed in units of 8×8 blocks, for example.

Figure 10:
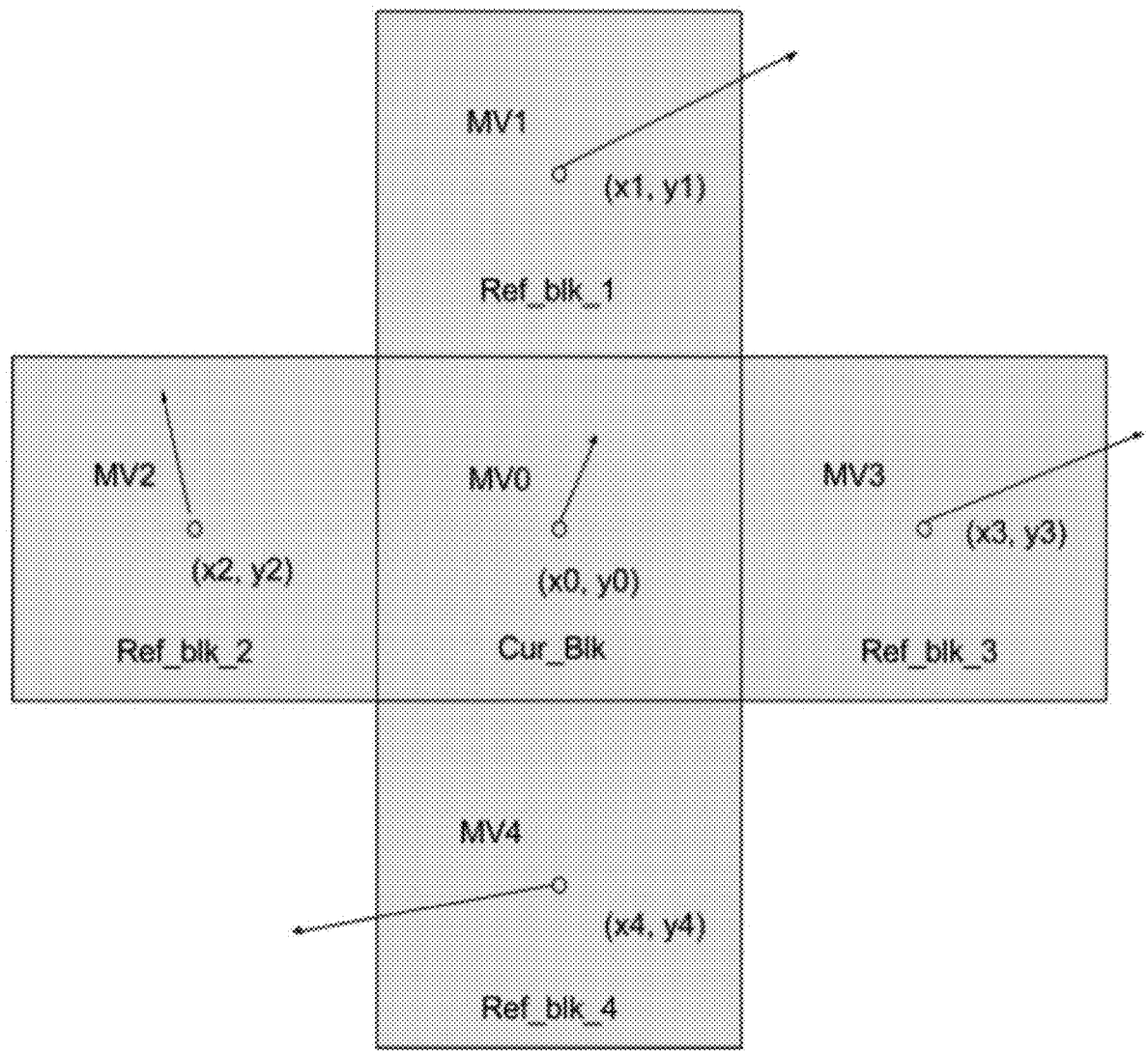
FIG. 10 is a diagram used to explain an affine homographic model according to the teachings herein.

Rendering may include determining parameters that form an affine homographic model for respective blocks of the current frame, and solving the affine homographic model. FIG. 10 is a diagram used to explain an affine homographic model according to the teachings herein.

The diagram of FIG. 10 shows an example of a motion field associated with an 8×8 block of the previously reconstructed reference frame that is denoted as the current block Cur_Blk. The motion vector of the current block Cur_Blk is MV0, and MV0 is shown extending from a central location in the frame identified as (x0, y0). In this example, spatial neighboring blocks of the current block Cur_Blk are labeled Ref_blk_1, Ref_blk_2, Ref_blk_3, and Ref_blk_4. The motion vectors of the spatial neighboring blocks Ref_blk_1, Ref_blk_2, Ref_blk_3, and Ref_blk_4 are MV1, MV2, MV3, and MV4, respectively. A central location in the frame for the spatial neighboring block Ref_blk_1 is marked (x1, y1), a central location in the frame for the spatial neighboring block Ref_blk_2 is marked (x2, y2), a central location in the frame for the spatial neighboring block Ref_blk_3 is marked (x3, y3), and a central location in the frame for the spatial neighboring block Ref_blk_1 is marked (x4, y4).

The affine homographic model may be defined by a 6-parameter matrix:

$$R = \begin{bmatrix} a & b \\ c & d \end{bmatrix}; \text{ and}$$

$$\hat{t} = \begin{pmatrix} e \\ f \end{pmatrix}.$$

The parameters a, b, d, and e represent rotation and scaling, and the parameters c and f represent translational offsets in vertical and horizontal directions. The matrix projects a pixel position (x, y) in the reconstructed reference frame towards a pixel position (x', y') in the motion-field based reference frame. To estimate these affine parameters for the current block Cur_Blk, the motion information for the spatial neighboring blocks may be used. The problem is formulated as:

$$\min_{R,\hat{t}} \|P' - RP + \hat{t}\Gamma\|_F \qquad (1)$$

P is an array of the central positions of the spatial neighboring blocks, as follows:

$$P = \begin{bmatrix} (x0, y0) \\ (x1, y1) \\ (x2, y2) \\ (x3, y3) \\ (x4, y4) \end{bmatrix}^T \qquad (2)$$

P' is an array of positions (x', y') in the reference frame, as follows:

$$P' = \begin{bmatrix} (x0 + mv0\_row, y0 + mv0\_col) \\ (x1 + mv1\_row, y1 + mv1\_col) \\ (x2 + mv2\_row, y2 + mv2\_col) \\ (x3 + mv3\_row, y3 + mv3\_col) \\ (x4 - mv4\_row, y4 + mv4\_col) \end{bmatrix}^T \qquad (3)$$

where mv0_row is a first component of the motion vector MV0, mv0_col is a second component of the motion vector MV0, mv1_row is a first component of the motion vector MV1, mv1_col is a second component of the motion vector MV1, mv2_row is a first component of the motion vector MV2, mv2_col is a second component of the motion vector MV2, mv3_row is a first component of the motion vector MV3, mv3_col is a second component of the motion vector MV3, mv4_row is a first component of the motion vector MV4, and mv4_col is a second component of the motion vector MV4. Each first component can be a vertical component, and each second component can be a horizontal component.

Γ is a 1×5 vector whose entries are all ones, as follows:
Γ=(1, 1, 1, 1, 1).

The subscript F in equation (1) refers to a general distance metric for two vectors (also called a norm). Examples of norms include F=1, the sum of absolute distances between each element; F=2, the sum of squared distances between each element; and F=infinite, a maximum distance across any pair of elements. In the implementations described herein, F=2.

The above optimization problem can be solved by doing the following two steps. In a first step, $\hat{t}$ is fixed, and R is solved according to:

$$R = (P'P^T - \hat{t}\hat{T} P^T)(PP^T)^{-1} \quad (4)$$

In a second step, R is fixed, and $\hat{t}$ is solved according to:

$$\hat{t} = (P'P^T - RP\Gamma^T)(\Gamma\Gamma^T)^{-1} \quad (5)$$

The order of these steps can be reversed.

It is clear from the above formulation that the number of projection pairs needed to solve the affine homographic model can vary. This property can be useful when a (e.g., 8×8) block does not have all the motion field motion vectors around it available. For example, a block may be located along an edge of the frame. In such situations, the rank of P and P' may be reduced in the above equations.

The solution of equations (4) and (5) are the parameters a through f that form the affine homographic model. The current block Cur_Blk can be rendered by mapping a pixel at a pixel position (x, y) in the current block Cur_Blk towards a pixel position in the new motion field-based reference frame according to:

$$RB - \hat{t}\Gamma \quad (6)$$

where B is the vector whose elements are the pixel locations/positions of the current block.

The processing at 808 can be repeated for each block of the reconstructed reference frame. The rendered blocks can be arranged according to the pixel positions of the respective current blocks (e.g., the co-located blocks) used in the generation of each of the rendered blocks, and the resulting frame is the motion field-based reference frame.

At 810, a prediction process is performed using the motion field-based reference frame generated at 808. Performing a prediction process at an encoder can include generating a prediction block from a motion field-based reference frame for a current block of the frame. The motion field-based reference frame may be stored in a reference frame buffer within memory.

Generating the prediction block at an encoder can include performing a motion search within the motion field-based reference frame to select the best matching prediction block for the current block. However the prediction block is generated at the encoder, the resulting residual can be further processed, such as using the lossy encoding process described with regard to the encoder 400 of FIG. 4.

At an encoder, the process 800 may form part of a rate distortion loop for the current block that uses various prediction modes, including one or more intra prediction modes and both single and compound inter prediction modes using the available prediction frames for the current frame. A single inter prediction mode uses only a single forward or backward reference frame for inter prediction. A compound inter prediction mode uses both a forward and a backward reference frame for inter prediction. In a rate distortion loop, the rate (e.g., the number of bits) used to encode the current block using respective prediction modes is compared to the distortion resulting from the encoding. The distortion may be calculated as the differences between pixel values of the block before encoding and after decoding. The differences can be a sum of absolute differences or some other measure that captures the accumulated error for blocks of the frames.

In some implementations, it may be desirable to limit the use of the motion field-based reference frame to the single inter prediction mode. That is, the motion field-based reference frame may be excluded as a reference frame in any compound reference mode. This can simplify the rate distortion loop, and little additional impact on the encoding of a block is expected because the motion field-based reference frame already considers both a forward and a backward reference frame. According to an implementation described herein, a flag may be encoded into the bitstream to indicate whether or not a motion field-based reference frame is available for use in encoding the current frame. The flag may be encoded when any single block within the current frame is encoded using a motion field-based reference frame block, in an example. Where the motion field-based reference frame is available for a current frame, it is possible to include an additional flag or other indicator (e.g., at the block level) indicating whether or not the current block was encoded by inter prediction using the motion field-based reference frame.

The prediction process at 810 may be repeated for all blocks of the current frame until the current frame is encoded.

In a decoder, performing a prediction process using the motion field-based reference frame at 810 may result from a determination that a motion field-based reference frame is available for decoding the current frame. In some implementations, the determination is made by inspecting a flag that indicates that at least one block of the current frame was encoded using the motion field-based reference frame. Performing the prediction process at 810 in the decoder can include generating a prediction block. Generating the prediction block can include using an inter-prediction mode decoded from the encoded bitstream, such as from a block header. A flag or indicator can be decoded to determine the inter-prediction mode. When the inter-prediction mode is a motion field-based reference frame mode (i.e., the block was inter-predicted using the motion field-based reference frame), the prediction block for the current block to be decoded is generated using pixels of the motion field-based reference frame and a motion vector mode and/or a motion vector.

The same processing to produce a motion field-based reference frame for use in a prediction process as part of decoding may be performed at a decoder, such as the decoder 500, as was performed at the encoder. For example, when the flag indicates that at least one block of the current frame was encoded using the motion field-based reference frame, the entire motion field-based reference frame can be generated and stored for use in the prediction process. However, additional savings in computational power at the decoder may occur by modifying the process 800 to limit performance of the process 800 where coding blocks are identified as using the co-located, motion field-based reference frame as an inter-prediction reference frame. This may be described by reference to FIG. 11, which is a diagram illustrating one technique for optimizing a decoder.

Figure 11:
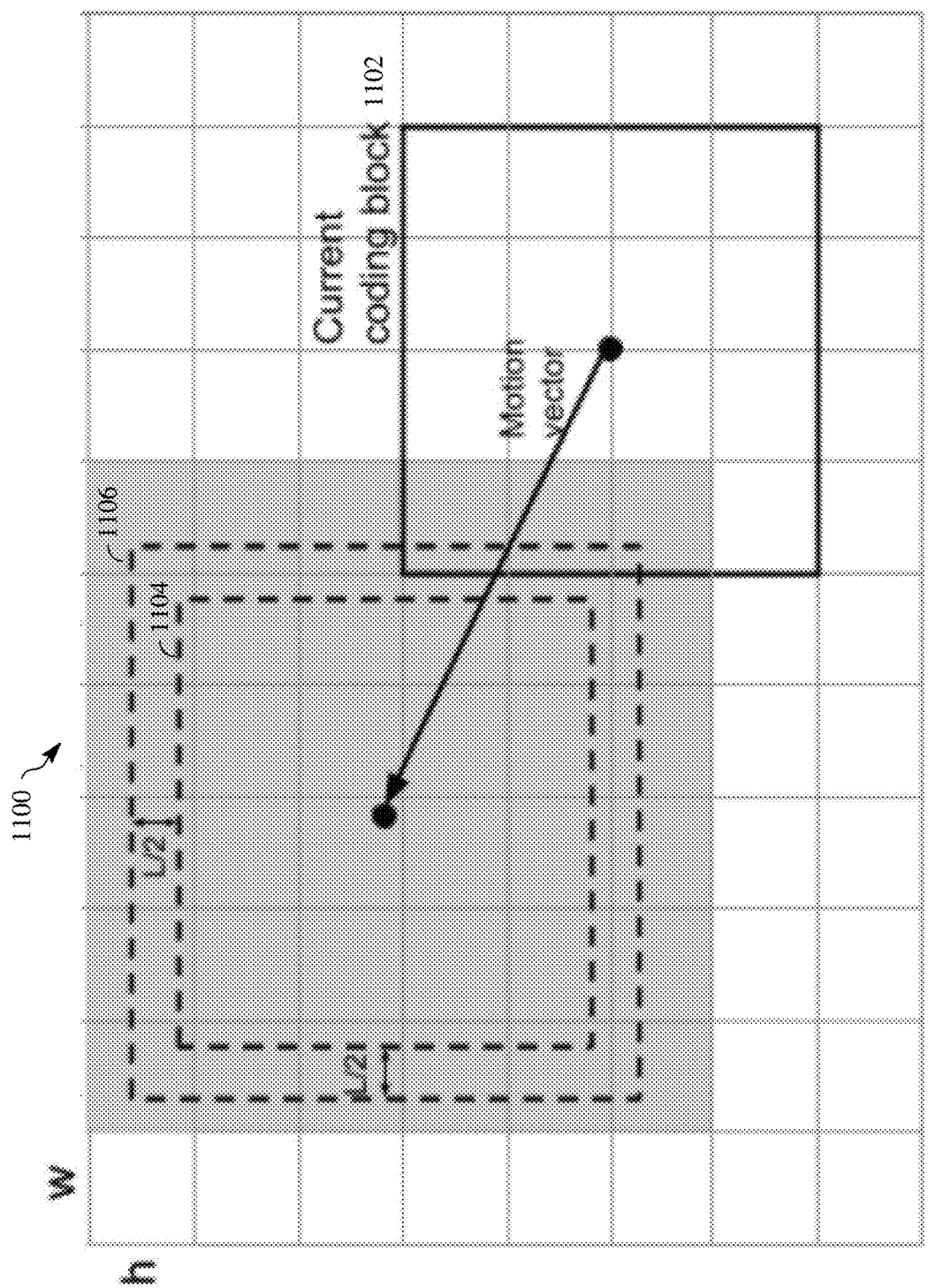
FIG. 11 is a diagram illustrating a technique for optimizing a decoder.

In FIG. 11, pixels are shown along a grid 1100 with w representing a pixel location along a first axis of the grid 1100 and with y representing a pixel location along a second axis of the grid 1100. The grid 1100 represents pixel locations of a portion of the current frame. To perform the prediction process at a decoder at 810, the processing at 806 and 808 may be performed as part of the processing at 810. For example, before performing the process starting at 806, the prediction process at 810 can include finding pixel locations for the reference block used to encode the current block (e.g., from header information, such as a motion vector). In FIG. 11, the motion vector for the current coding block 1102 points to a reference block represented by the inner dashed line 1104. The current coding block 1102 comprises 4×4 pixels in this example. The reference block location is shown by the dashed line 1104 because the reference block is located in the reference frame, and not in the current frame, but its co-located pixel locations in the current frame are used in the prediction process.

More specifically, once the reference block is located, all of the blocks that are spanned by (i.e., overlap) the pixel locations of the reference block are identified. This may include extending the reference block size by half of the filter length at each boundary to consider sub-pixel interpolation filters. In FIG. 11, the sub-pixel interpolation filter length L is used to extend the reference block to the boundaries represented by the outer dashed line 1106. As is relatively common, the motion vector results in a reference block that does not align perfectly with the full-pel locations. The darkened area in FIG. 11 represents the full-pel locations. All of the reference blocks that overlap the full-pel locations are identified. Assuming the block sizes are the same as the current coding block 1102, a first reference block that is co-located with the current block, a second reference block that is above the first reference block, two reference blocks that extend from the left of the first reference block, and two reference blocks that extend from the left of the second reference block are identified.

Once the reference blocks are identified, the process 800 may be performed at 806 and 808 for only some blocks within the current frame so as to produce the co-located, motion field-based reference blocks. This can include blocks within the current frame that are co-located with the identified reference blocks, plus any blocks within the current frame that are co-located with spatial neighboring block(s) not already identified that are used for forming the affine homographic model for a block.

According to this modified process, it is ensured that the encoder and decoder have the same predictor while the decoder does not need to calculate the entirety of the co-located reference frame. It is worth noting that reference block(s) for a subsequent block, including any extended borders, may overlap one or more reference blocks identified in the decoding process of the current block. In this case, the motion field estimation need be performed for any of the identified blocks only once to further reduce computing requirements at the decoder. In other words, a reference block generated at 808 may be stored for use in decoding other blocks of the current frame.

However the prediction block is generated at the decoder, the decoded residual for the current block from the encoded bitstream can be combined with the prediction block to form a reconstructed block as described by example with regard to the decoder 500 of FIG. 5.

The prediction process at 810, whether performed after or in conjunction with the processing at 806 and 808, may be repeated for all blocks of the current frame that were encoded using a motion field-based reference frame until the current frame is decoded. When processing blocks in the a decoding order, a block that is not encoded using an motion field-based reference frame can be conventionally decoded according to the prediction mode decoded for the block from the encoded bitstream.

The teachings herein provide various advantages for video compression performance. For example, the motion field effectively provides a closed boundary information for any block of interest, such that the affine homographic model can be estimated more precisely. The motion field rendered reference frame allows the encoder to run an effective motion search, resulting in good prediction quality. This co-located reference frame can be used to eliminate the use of a rendered frame may have 1 or 2 pixels offset from the current frame.

For simplicity of explanation, the process 800 is depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized that contains other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:
    determining a first frame to be predicted, the first frame being in a video sequence;
    determining a first reference frame from the video sequence for forward inter prediction of the first frame;
    determining a second reference frame from the video sequence for backward inter prediction of the first frame;
    determining a respective motion field for blocks of the first frame using at least one of the first reference frame or the second reference frame;
    determining parameters forming an affine homographic model for a block of the first frame using the motion field for the block of the first frame;
    generating a motion field-based reference frame, wherein generating the motion field-based reference frame includes rendering a block within the motion field-based reference frame that is at a co-located position with the block of the first frame using pixels in a reconstructed reference frame projected towards the motion field-based reference frame using the affine homographic model; and
    performing an inter prediction process for the first frame using the motion field-based reference frame, including:
        determining a prediction block for a first block of the first frame using pixels of the motion field-based reference frame; and
        encoding or decoding the first block using the prediction block,
    wherein rendering the block comprises mapping a pixel at a pixel position in the reconstructed reference frame towards a pixel position in the motion field-based reference frame according to:

$RB - \hat{t}\Gamma$ wherein:
    B is a vector whose elements are pixel locations in the reconstructed reference frame;
    $\Gamma$ is a 1×5 vector whose entries are all ones;

$R = \begin{bmatrix} a & b \\ c & d \end{bmatrix};$ $\hat{t} = \begin{pmatrix} e \\ f \end{pmatrix};$ and
    a, b, c, d, e, and f are the parameters forming the affine homographic model.

2. The method of claim 1, wherein determining the motion field comprises:
    performing linear projection using motion vectors of one of the first reference frame or the second reference frame; and
    using the linear projection to determine motion vectors extending from blocks of the current frame to at least one of the first reference frame or the second reference frame.

3. The method of claim 1, wherein determining the motion field comprises:
    projecting a motion vector for predicting a block of the second reference frame to the current frame to define a projected block position within the first frame;
    estimating a motion vector from the projected block position to the first reference frame using the motion vector for predicting the block of the second reference frame; and
    estimating a motion vector from the projected block position to the second reference frame using the motion vector for predicting the block of the second reference frame.

4. The method of claim 3, wherein:
    the motion vector for predicting the block of the second reference frame is associated with a reference frame for predicting the second reference frame having a reference frame index,
    the first frame is a current frame having a current frame index,
    the first reference frame has a first frame index,
    the second reference frame has a second frame index,
    estimating the motion vector from the projected block position to the first reference frame comprises modifying the motion vector for predicting the block of the second reference frame using the reference frame index, the current frame index, the first frame index, and the second frame index; and
    estimating the motion vector from the projected block position to the second reference frame comprises modifying the motion vector for predicting the block of the second reference frame using the reference frame index, the current frame index, the first frame index, and the second frame index.

5. The method of claim 1, wherein determining the respective motion field for blocks of the first frame comprises assuming that each motion field for a block is linear in time.

6. The method of claim 1, wherein the reconstructed reference frame is one of the first reference frame or the second reference frame.

7. The method of claim 1, wherein performing the inter prediction process for the first frame using the motion field-based reference frame comprises performing a motion search within the motion field-based reference frame for the first block of the first frame.

8. The method of claim 1, further comprising:
determining a first motion vector used to encode the first block of the first frame, wherein:
determining the respective motion field for blocks of the first frame comprises determining a respective motion field for each block of the first frame that overlaps pixel positions identified by the first motion vector.

9. The method of claim 1, wherein determining the parameters forming the affine homographic model using the motion field comprises, for a current block of the first frame, determining the parameters forming the affine homographic model for the current block using central positions of the current block and at least two neighboring blocks and using the motion field of the current block and the at least two neighboring blocks.

10. An apparatus, comprising:
a processor; and
a non-transitory storage medium that includes instructions executable by the processor to carry out a method comprising:
determining a first frame to be predicted, the first frame being in a video sequence;
determining a first reference frame from the video sequence for forward inter prediction of the first frame;
determining a second reference frame from the video sequence for backward inter prediction of the first frame;
determining a respective motion field for blocks of the first frame using at least one of the first reference frame or the second reference frame;
determining parameters forming an affine homographic model for a block of the first frame using the motion field for the block of the first frame;
generating a motion field-based reference frame, wherein generating the motion field-based reference frame includes rendering a block within the motion field-based reference frame that is at a co-located position with the block of the first frame using pixels in a reconstructed reference frame projected towards the motion field-based reference frame using the affine homographic model; and
performing an inter prediction process for the first frame using the motion field-based reference frame, including:
determining a prediction block for a first block of the first frame using pixels of the motion field-based reference frame; and
encoding or decoding the first block using the prediction block,
wherein the instructions for rendering the block comprises instructions for mapping a pixel at a pixel position in the reconstructed reference frame towards a pixel position in the motion field-based reference frame according to:

$$RB - \hat{t}\Gamma$$

wherein:
B is a vector whose elements are pixel locations in the reconstructed reference frame;
$\Gamma$ is a 1×5 vector whose entries are all ones:

$$R = \begin{bmatrix} a & b \\ c & d \end{bmatrix};$$

$$\hat{t} = \begin{pmatrix} e \\ f \end{pmatrix};$$

and
a, b, c, d, e, and f are the parameters forming the affine homographic model, which are integer values.

11. The method of claim 1, wherein a, b, c, d, e, and f are integer values.

12. An apparatus, comprising:
a processor; and
a non-transitory storage medium that includes instructions executable by the processor to carry out a method comprising:
determining a first frame from a video sequence;
determining a first reference frame from the video sequence for forward inter prediction of the first frame;
determining a second reference frame from the video sequence for backward inter prediction of the first frame;
determining a motion field for at least some of the blocks of the first frame using at least one of the first reference frame or the second reference frame;
generating at least one affine homographic model using the motion field;
generating a motion field-based reference frame, wherein generating the motion field-based reference frame includes rendering a block within the motion field-based reference frame that is at a co-located position with a block of the first frame using pixels in a reconstructed reference frame projected towards the motion field-based reference frame using the affine homographic model of the block of the first frame; and
performing an inter prediction process for the first frame using the motion field-based reference frame, including:
determining a prediction block for a first block of the first frame using pixels of the motion field-based reference frame; and
encoding or decoding the first block using the prediction block,
wherein generating the at least one affine homographic model using the motion field comprises, for a current block of the first frame, instructions for determining parameters forming the affine homographic model for the current block using central pixel positions of the current block and neighboring blocks of the current block and motion fields of the current block and the neighboring blocks of the current block by solving:

$$\min_{R,\hat{t}} \| P' - RP + \hat{t}\Gamma \|_F$$

wherein:

$$R = \begin{bmatrix} a & b \\ c & d \end{bmatrix};$$

$$\hat{t} = \begin{pmatrix} e \\ f \end{pmatrix};$$

a, b, c, d, e, and f are the parameters forming the affine homographic model;
Γ is a 1×5 vector whose entries are all ones;
P is an array of the central pixel positions;
P' is an array of positions in the reference frame determined by modifying a respective central pixel positions by respective vertical and horizontal components of a respective motion field; and
F is a norm for two vectors.

13. The apparatus of claim 12, wherein:
the at least some blocks of the first frame comprise all blocks of the first frame, each block comprising non-overlapping portions of the first frame having equal dimensions,
the instructions for generating the at least one affine homographic model comprises instructions for generating a respective affine homographic model for each block of the first frame, and
the instructions for generating the motion field-based reference frame comprises instructions for rendering each block of the motion field-based reference that is at a co-located position with a respective block of the first frame using the respective affine homographic model for the block of the first frame.

14. The apparatus of claim 12, wherein the instructions further comprise instructions for:
decoding a residual corresponding to the first block, wherein performing the inter prediction process comprises:
determining pixel positions of the prediction block of the first block using a motion vector of the first block; and
determining values for the pixel positions of the prediction block from the motion field-based reference frame.

15. The apparatus of claim 12, wherein the central pixel positions and the motion fields comprise a central pixel position and a motion field of the current block, a central pixel position and a motion field of a first neighboring block located above the current block, a central pixel position and a motion field of a second neighboring block located below the current block, a central pixel position and a motion field of a third neighboring block located left of the current block, a central pixel position and a motion field of a fourth neighboring block located right of the current block.

16. The apparatus of claim 12, wherein the reconstructed reference frame is a closest reconstructed frame of the video sequence to the first frame.

17. The apparatus of claim 12, wherein the instructions for performing the inter prediction process for the first frame using the motion field-based reference frame comprises instructions for performing a motion search within the motion field-based reference frame for the first block of the first frame.

* * * * *